US008462380B2

(12) United States Patent
Moore et al.

(10) Patent No.: US 8,462,380 B2
(45) Date of Patent: Jun. 11, 2013

(54) IN-LINE IMAGE GEOMETRICS MEASUREMENT VIA LOCAL SAMPLING ON SHEETS IN A PRINTING SYSTEM

(75) Inventors: Steven R Moore, Pittsford, NY (US); Chetan Keny, Billerica, MA (US)

(73) Assignee: Xerox Corporation, Norwalk, CT (US)

( * ) Notice: Subject to any disclaimer, the term of this patent is extended or adjusted under 35 U.S.C. 154(b) by 550 days.

(21) Appl. No.: 12/252,532

(22) Filed: Oct. 16, 2008

(65) Prior Publication Data
US 2010/0097620 A1   Apr. 22, 2010

(51) Int. Cl.
*G06K 15/10* (2006.01)

(52) U.S. Cl.
USPC .......................................................... 358/1.5

(58) Field of Classification Search
None
See application file for complete search history.

(56) References Cited

U.S. PATENT DOCUMENTS

| 4,429,866 A | 2/1984 | Castro-Hahn |
| 6,068,362 A * | 5/2000 | Dunand et al. .................. 347/16 |
| 6,155,669 A | 12/2000 | Donahue et al. |
| 6,175,700 B1 | 1/2001 | Miller et al. |
| 6,411,324 B1 * | 6/2002 | Christiansen et al. ........ 347/248 |
| 6,639,669 B2 | 10/2003 | Hubble, III et al. |
| 6,909,516 B1 | 6/2005 | Hoover |
| 6,935,998 B2 * | 8/2005 | Silvestre ........................ 493/405 |
| 6,975,949 B2 * | 12/2005 | Mestha et al. ................... 702/76 |
| 7,120,272 B2 * | 10/2006 | Guiguizian ..................... 382/100 |
| 7,433,086 B2 * | 10/2008 | Miller et al. .................. 358/3.27 |
| 7,643,181 B2 * | 1/2010 | Haas et al. .................... 358/3.28 |
| 2002/0026879 A1 * | 3/2002 | Goldstein ...................... 101/486 |
| 2006/0023057 A1 * | 2/2006 | Jung .............................. 347/179 |
| 2009/0016776 A1 * | 1/2009 | Priebe et al. ................... 399/231 |

* cited by examiner

*Primary Examiner* — Marivelisse Santiago Cordero
*Assistant Examiner* — John Wallace
(74) *Attorney, Agent, or Firm* — Pillsbury Winthrop Shaw Pittman, LLP

(57) ABSTRACT

This invention generally relates to accurately measuring image geometries in-line within a printing system. One or more two-dimensional array sensors may be located adjacent to a sheet of media printed with a predefined array of indicia marks so that the sensor field of view is contained within the plane of sheet transport. As the sheet is transported by the sensor, the sensors continuously record the locations of the indicia marks within its field of view. The spatial frequency of the indicia marks is arranged so that at least two indicia marks are within the field of view of the sensor at any instant for each of the process and cross-process directions. The two-dimensional array sensor can thus measure the absolute spacing between adjacent local indicia marks within the precision of the sensor construction. The cumulative spacing along each direction may then calculated to determine the overall dimensions of the indicia marks array. A measurement procedure is also provided to accurately measure image geometries, even in the presence of significant sheet velocity variations.

24 Claims, 8 Drawing Sheets

IN-LINE IMAGE GEOMETRICS MEASUREMENT VIA LOCAL SAMPLING ON SHEETS IN A PRINTING SYSTEM

FIELD

This application generally relates to systems and methods for in-line image geometries measurement via local sampling of sheets in a printing system.

BACKGROUND

In printing production, there are many metrics that place stringent requirements upon the image location accuracy. Such geometrical metrics (or "geometrics," as they may be referred to) may include, among other things: Image on Paper (IOP) registration, average magnification, and Side 1-to-Side 2 show-through.

IOP registration quantifies an offset of where an image was actually printed on the sheet from where it was supposed to be printed on the sheet. Typically, measurements are made, usually from one corner of the sheet, to determine the displacement of the image from the lead and side edges with respect to the image. The angular rotation of the image from where it was supposed to be may also be determined. This information may be analyzed to determine how close (or far off) the image was printed from its intended position.

Average magnification quantifies how the size of the image printed compares to what is was supposed to be. This may include measuring the area of the printed image comparing it with the area that was supposed to be printed.

Side 1-to-Side 2 show-through quantifies how images printed on each side of a sheet line up. Essentially, IOP registration is performed on each side of the sheet and the resultant measurements are compared.

These geometries may then be made available for feedback and correction within a print engine. For example, actuators within the image path and/or media path may be altered, and/or input image data may be corrected and/or compensated based on these geometries.

Currently, it is known to collect image geometries data on printed samples using an off-line scanner that has been calibrated for absolute accuracy. However, the workflow for providing feedback to the printing system includes manual aspects, thus requiring extra resources (e.g., labor and time) to accomplish.

SUMMARY

According to one aspect of the application, a system for accurately measuring image geometries within a printing system by measuring a two-dimensional array of indicia marks provided on a sheet of print media, is provided, the system comprising: a two-dimensional array sensor configured to capture an image of the two-dimensional array of indicia marks provided on the sheet; a sheet transport configured for move the sheet past the sensor; and an image processor configured to analyze the captured image and to identify the position of indicia marks and determine the spacing between adjacent indicia marks.

According to another aspect of the application, a method for accurately measuring image geometries within a printing system by measuring a two-dimensional array of indicia marks provided on a sheet of print media, is provided, the method comprising: capturing an image of the two-dimensional array of indicia marks provided on the sheet using a two-dimensional array sensor moving the sheet past the sensor; and analyzing the captured image and to identify the position of indicia marks and determine the spacing between adjacent indicia marks.

Other objects, features, and advantages of one or more embodiments of the present invention will seem apparent from the following detailed description, and accompanying drawings, and the appended claims.

BRIEF DESCRIPTION OF THE DRAWINGS

Embodiments of the present invention will now be disclosed, by way of example only, with reference to the accompanying schematic drawings in which corresponding reference symbols indicate corresponding parts, in which.

DETAILED DESCRIPTION

Figure 1:
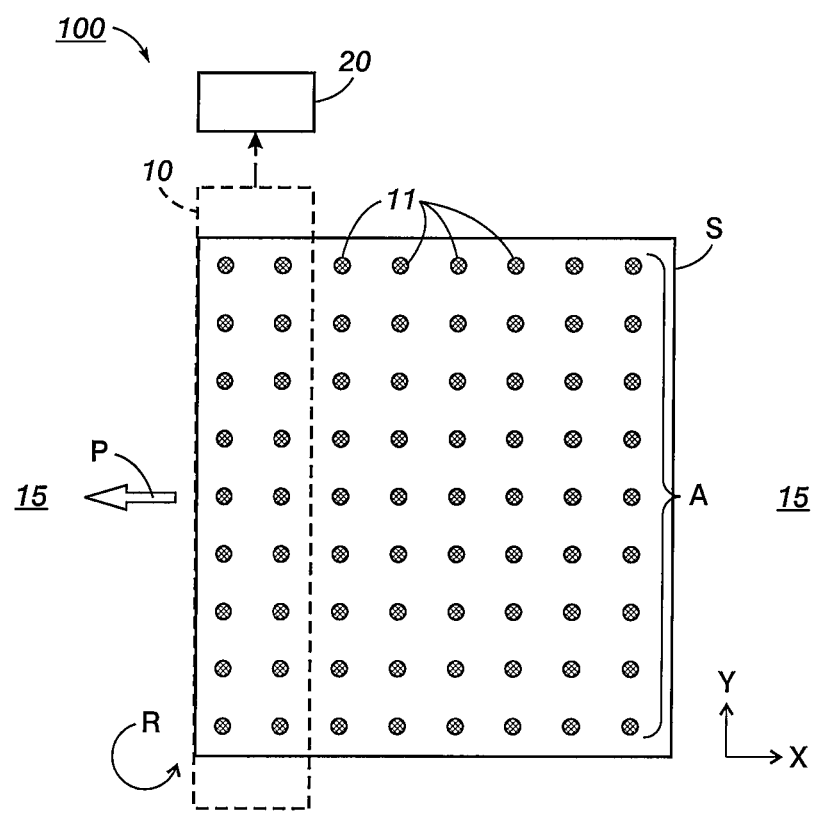
FIG. 1 shows an exemplary system architecture for an in-line image geometries measurement system, according to an aspect of the application.

FIG. 1 shows an exemplary system architecture 100 for an in-line image geometries measurement system, according to an aspect of the application.

The system 100 may advantageously automatically print and measure test and/or diagnostic pages. Preferably, the test of diagnostic page is a sheet of print media S that is printed with a predefined array A of indicia marks 11.

The indicia marks 11 may include, for example, a plurality of registration, alignment or fiducial marks. In one implementation (as shown), the indicia marks 11 may include round dots (●). The indicia marks 11 may also include square/rectangular dots (■), cross-hairs (+), chevrons (V), horizontal/vertical bars (| or _) or any other symbols or indicia.

Preferably, the array A is two-dimensional (2D) orthogonally aligned array, although it will be appreciated that one or more one-dimensional (1D) arrays and orientations, might be used also. In one implementation (as shown), a 9×8 array A may be printed having 9 rows and 8 columns of indicia marks 11. Other dimensioned arrays are also possible, such as 5×5, 10×10 or 100×100.

While the indicia marks 11 are shown printed with visible inks, in other embodiments "invisible" inks might also be used which are observable in infrared (IR) or ultraviolet (UV) spectra. For example, the indicia marks 11 may be "invisible" or "transparent" marks which have a reflectivity in the IR spectra, for example, at about 900 nm (wavelength).

The sheet S may be any media having a length and a width oriented in an x-y plane. The x-direction and the y-direction may be also be referred to as the "process" and the "cross-process" directions, respectively. For example, the sheet S may be standard A4 paper, 8½×11 inch letter paper or 8½×14 inch legal paper. Other sizes and media types may similarly be used, such as, bond paper, parchment, cloth, cardboard, plastic, transparencies, film, foil, or other print media substrates. While the sheet S is shown oriented in the lengthwise direction ("portrait" orientation) in the figures, the sheet S may be similarly oriented in the widthwise direction ("landscape" orientation).

Once the array is printed on the sheet S, the sheet S is then transported past the field of view (FOV) of a sensor 10 for measurement and onward to an optional output destination/finisher (not shown). The output destination/finisher may include one of a plurality of output destinations, or output trays, as known in the art. The sensor may be located in the output media path 15 of a printing system, downstream of a print engine for example, as part of a transport mechanism. For clarity, the position of the sensor 10 with respect to the sheet S is shown in broken-line form.

In one implementation, the sensor 10 may include a two-dimensional (2D) array of sensing elements, such as charged couple devices (CCD). The sensor 10 may be used to evaluate a variety of metrics related to output print quality as well as assure job integrity. Image geometries are one set of metrics that may be important. In one implementation, the sensor may be a Full Width Array (FWA) sensor, which typically contains a single row of imaging pixels which may span the entire length of the sheet in the cross-process direction, for example, as disclosed in U.S. Pat. No. 6,975,949, which is incorporated herein by reference in its entirety.

The print engine may be preferably configured to print the indicia marks 11 of the sheet S, as well as, ordinary print jobs. It may be further possible to have multiple print engines and/or a designated print engine for printing the indicia marks. In one implementation, the print engine may be a part of a xerographic printing system. However, it will be appreciated that the print engine may be configured for other kinds of printing technology, such as, for example, ink-jet, laser, offset, solid-ink, dye sublimation, etc, may similarly be used.

The array A may be printed on a test or calibration sheet, as a diagnostic or intermittently during printing, and may be separated from the output media path and delivered to a test sheet output destination (e.g., a purge tray), while the other sheets are delivered to the output finisher destination specified for the print job, for example, as disclosed in U.S. Pat. No. 6,175,700, herein incorporated by reference in its entirety. Moreover, the test or calibration sheet may be run automatically or requested manually by a user.

As the sheet S is conveyed beneath the sensor 10, sensor 10 captures and stores image data. The sensor 10 may capture an image of the sheet S and the array A of indicia marks 11. This image may be transmitted to an image processor 20 for further analysis.

The image processor 20 may be configured to identify the locations of the indicia marks 11. With this information, the processor 20 may also determine the spacing between adjacent indicia marks, for example, in the process and cross-process directions and/or angular rotations. In addition, the processor 20 may be configured to identify edges of the sheet S. This information may be used for identifying and evaluating geometries of the printing system.

This methodology may work effectively if the sheet is traveling at a velocity (speed), for example, in the process direction P. For example, typically sheets in a printing system may be traveling about 0.5 to 1.5 m/s.

However, due to variations in the velocity of the sheet in the process direction P, as well as, in a rotation direction (or skew direction) R of the sheet, accurate measurements of process direction may be difficult to obtain. For example, the velocity of the sheet S may vary at any instance.

Figure 2:
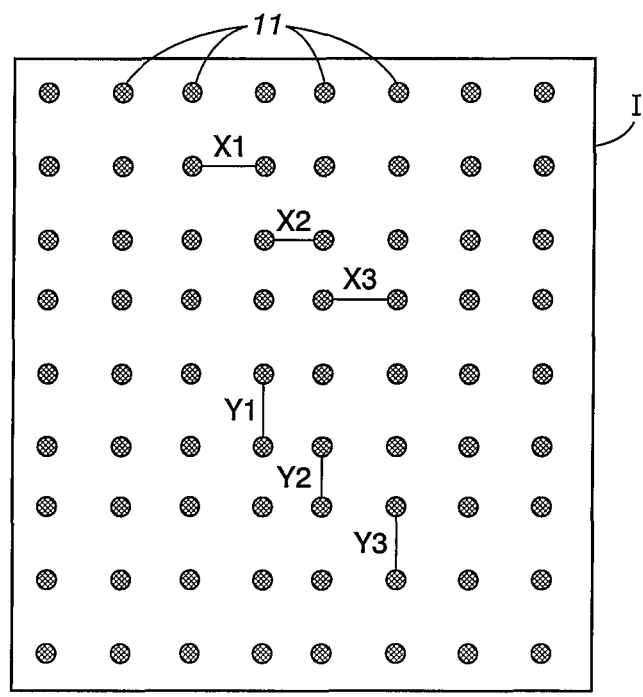
FIG. 2 shows the resultant image corresponding to the sheet having the array of indicia marks that was captured and measured by the system shown in FIG. 1.

FIG. 2 shows the resultant image I corresponding to the sheet S having the array A of indicia marks 11 that was captured and measured by the system 100 shown in FIG. 1.

Although the indicia marks 11 are printed by the print engine substantially equally-spaced in the process and cross-process directions, due to variations in the velocity and/or skew of the sheet S, the distances as measured between the centers of adjacent registration mark 11 may be significantly compromised. For example, the distances x1, x2, x3 measured in the process direction between the center points of adjacent registration mark 11 (which should be substantially the same) may not appear the same to the FWA sensor. Similarly, the distances y1, y2, y3 measured in the cross-process direction between the center points of adjacent registration mark 11 (which should be substantially the same) might not appear the same, either.

This phenomenon may occur because while the refresh rate (frame frequency) of the sensor is generally constant, the velocity of the sheet may vary. Thus, the indicia marks do not appear in sync with the sensor. As such, the positions of adjacent indicia marks 11 may appear closer or further away than they actually are on the sheet, as the image I is captured by the FWA sensor 10 shows.

Figure 3:
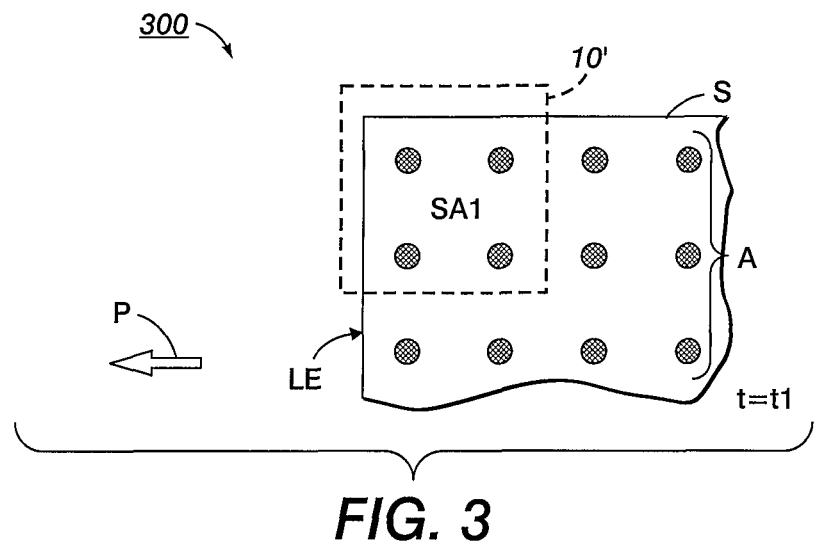
FIGS. 3-4 show an exemplary system architecture for an in-line image geometries measurement system, according to another aspect of the application; where.
Figure 4:
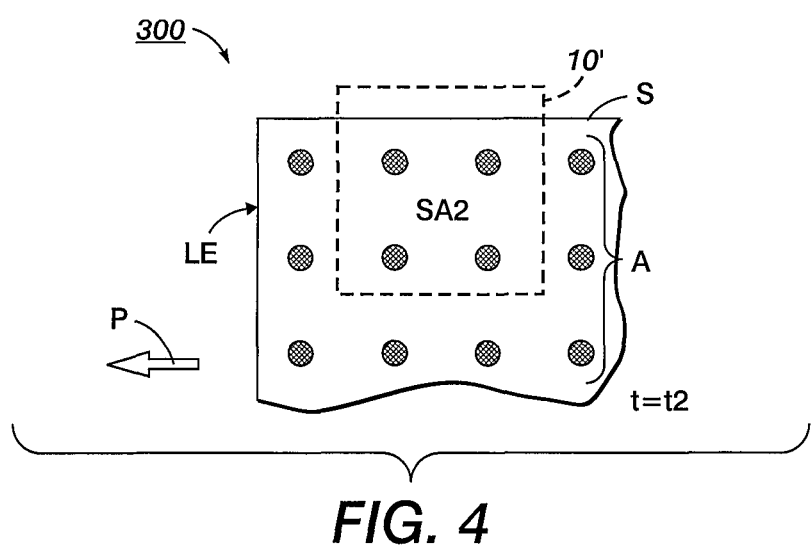

To ameliorate or alleviate this problem, a very precise sheet transport may be used to convey the sheet past the sensor, so as to keep the velocity of the sheet generally constant. In one implementation, the sheet transport may be configured to transport sheets at a constant velocity, without substantial velocity variations, for example, less than or equal to ±0.00025 m/s error. Such a sheet transport is disclosed, for example, in U.S. Pat. No. 4,429,866, herein incorporated by reference in its entirety. However, this may add significant costs and complexity to the printing system FIGS. 3-4 show an exemplary system architecture 300 for an in-line image geometries measurement system, according to another aspect of the application.

One or more two-dimensional array sensors 10' may be positioned to view a portion of the sheet S as it passes by. The FOV of the sensor 10' may be smaller in width than a FWA sensor. However, only a fraction of the sheet S and a fraction of the printed indicia marks 10 may be viewed at any instant in either the cross-process or process directions, respectively. While a single sensor 10' is shown, it will be appreciated that multiple sensors 10' may also be used. For clarity, the position of the sensor 10' with respect to the sheet S is shown in broken-line form.

The use of one or more smaller sensor arrays 10' may be more cost effective than using a larger FWA sensor. Although CCD sensor elements typically are very accurately formed on silicon, inaccuracies due to lighting or lens non-uniformities may exist. In one implementation, inaccuracies may be compensated, for example, by running a "calibration master" sheet past the sensor having precisely known indicia mark locations.

Preferably, the images of the entire array A are captured, for example, by using multiple sensors 10' that may be aligned in the cross-process direction. Although it will be appreciated that the entire array A need not be imaged, as important information may nonetheless be gleamed from a few measurements of one or more sub-arrays of array A. According to one implementation, overall cross-process direction geometries, such as average magnification, may be accurately estimated by placing sensors 10' to view both the lead edge corners of the sheet S. By measuring the cross-process direction locations of the first and last columns of indicia marks and comparing their respective locations to a pre-calibrated reference spacing between the sensors, an accurate estimate of the geometry and position of the array A can be obtained.

In another embodiment, a FWA sensor may be provided to measure cross-process direction geometries and one or more smaller sensors may 10' be used to process direction geometries. If multiple sensors 10' are arranged along the cross-process direction then the y-axis image geometries may be sampled accordingly.

As shown in FIG. 3, the two-dimensional sensor 10' may be configured to detect an 2×2 sub-array $SA_1$ of array A. It will be appreciated, though, that other dimensions are also possible. By reducing the FOV of the sensor, for example, only an image a little larger than the 2×2 sub-array $SA_1$ may be captured.

In other embodiments, a two-dimensional FWA sensor may be used, which spans the entire width of the sheet S in the cross-process direction, and includes a plurality of rows of sensors in the process direction. The image data from the two-dimensional FWA sensor may be analyzed by the processor 20 to extract image data for an area which is comparable, for example, to the smaller sensor 10'. Thus, the effective FOV of the FWA sensor can be effectively configured for any sized sub-array. The FWA sensor may advantageously be configured to capture images of a plurality of overlapping 2×2 sub-arrays of indicia marks 11.

According to a preferred embodiment, at any instant, there should be at least two indicia marks 11, or alternatively one indicia mark 11 and one sheet edge S within the sensor's FOV in one or both of the process direction and the cross-process direction. For example, the sensor's FOV, sensor's refresh rate, the spatial frequency (i.e., the spacing) of indicia marks, and/or the sheet velocity, among other things, may be selected for this purpose.

FIG. 3 show the sheet S at a first instance t=t1. A sub-array $SA_1$ of indicia marks is in the FOV of the sensor. The sensor captures an image of the sub-array $SA_1$.

FIG. 4 shows the same sheet S shown in FIG. 3 at a second instance t=t2. As can be seen, the sheet S has advanced further in the process direction P, and the sensor is now viewing the next sub-array $SA_2$ of the indicia marks. The sensor captures an image of the sub-array $SA_2$.

As can be seen, sub-array $SA_2$ is adjacent to the sub-array $SA_1$ and the two share common indicia marks. Preferably, for a 2×2 sub-array, each of the sub-arrays share a 2×1 subset of indicia marks. The sensor 10' may also be configured to distinguished edges of the sheet S, such as lead edge LE.

According to one preferred embodiment, the sensor 10' may be configured to permit a sufficiently high scanning rate such that multiple frame captures occur while the sheet passed the sensor. For example, the sensor may be capable of scanning 120 frames per second.

Figure 5A:
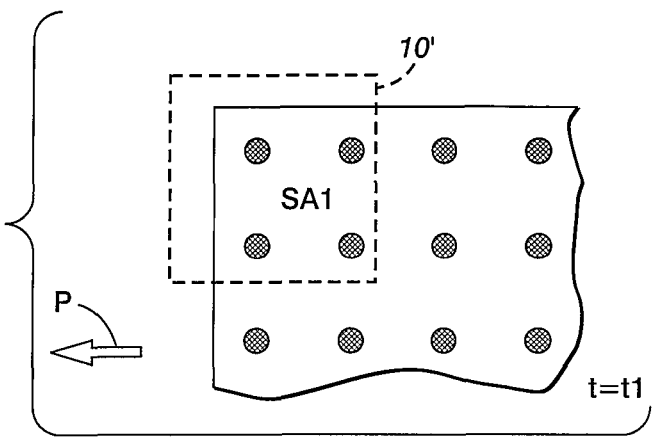
FIGS. 5a to 5c show captured multiple images of the same sub-array as the sheet passes the sensor, according to an aspect of the application.
Figure 5B:
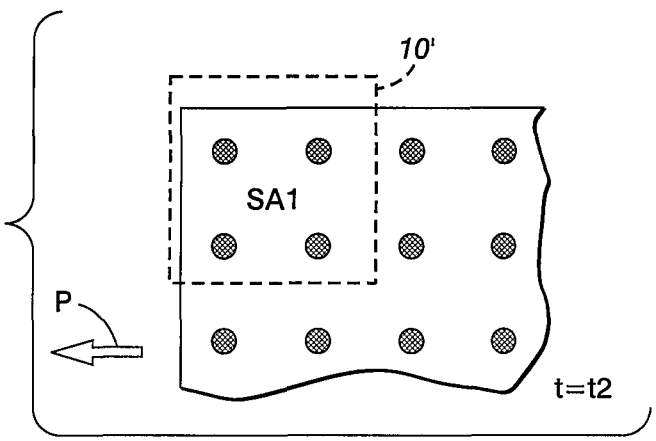
Figure 5C:
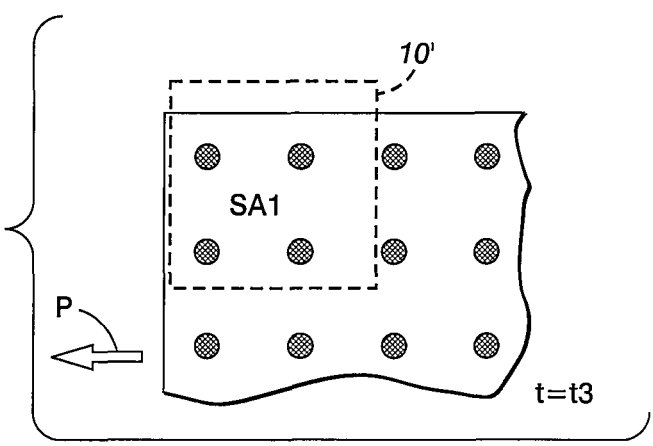

FIGS. 5a to 5c show capturing multiple images of the same sub-array $SA_1$ as the sheet passes the sensor, according to an aspect of the application.

At a first instance t=t1, the sheet S has initially moved under the sensor 10' such that the 2×2 sub-array $SA_1$ comes into view of the sensor, as shown in FIG. 5a. A first image of the sub-array $SA_1$ may be captured by the sensor at this instance.

Next, at a second instance t=t2, shown in FIG. 5b, the sensor captures a second image of the sub-array $SA_1$. While the sheet S has moved slightly in the process-direction with respect to the its prior position relative to the sensor at t1, the sub-array $SA_1$ is still in view of the sensor.

Similarly, as shown in FIG. 5c, at a third instance t=t3, the sensor captures a third image of the same sub-array $SA_1$, even though the sheet S has moved slightly in the process-direction with respect to its portions relative to the sensor at t2.

In this example, three images of the sub-array $SA_1$ were captured as the sheet moved past the FOV of the sensor 10'. Depending on the velocity of the sheet S, and the refresh rate of the sensor additional (or fewer) images might be captured for the same sub-array $SA_1$.

As described above, the distances between the centers of adjacent indicia marks 11 may be determined for each of the images by the processor 20 To increase the precision and accuracy of the images for the adjacent indicia marks 11, the processor 20 may look at the various images to determine an effective spacing between adjacent indicia marks.

In one implementation, the processor 20 may average the multiple distances between adjacent indicia marks to determine an effective spacing between adjacent indicia marks taken from the different images captured.

Additionally or alternatively, the processor 20 may disregard certain measurements which are outside a threshold (e.g., multiple standard deviations a). This approach may be effective in eliminating measurements readings that are likely to reflect an erroneous measurement due to sensing variation.

Other statistical techniques may also be used, such as, calculating the mode or the median. The processor 20 might also look to other measurements, for example, corresponding to a different sub-arrays $SA_1$, $SA_2$ of the array for comparison.

If a measurement of a spacing between local indicia marks has excessive variation that they may be determined to be due to sensing variation, the processor 20 may request a reprint of another sheet having the same array A for measurement. In some embodiments, various measurements of the array A from different sheets may be stored and compared. In addition, localized spacing measurements may be analyzed, not only for measurement of the sub-arrays on single sheet (see FIGS. 5a-5c), but for the sub-array on different sheets. More accurate precision may thus be realized, effectively ameliorating the effects of sensing variations of the sheet.

These measurement approaches therefore, may be advantageously unaffected by the sheet process speed variations, since a series of nearly instantaneous measurements (i.e., snapshots) may be processed in order to determine spacing between indicia marks, rather than a single image for the entire array A. Erroneous measurements may be ignored and/or disregarded.

Figure 6A:
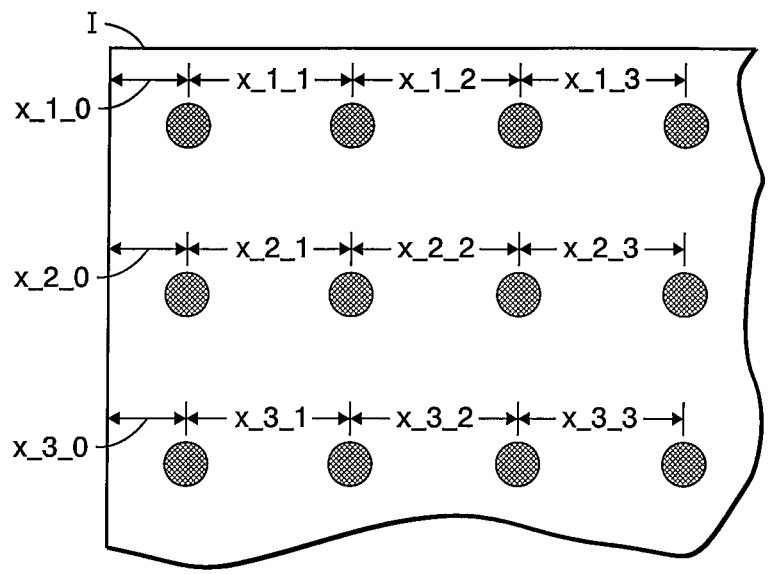
FIGS. 6a and 6b show exemplary measurements of an array of indicia marks that may be accurately determined by the processor, according to an aspect of the application.
Figure 6B:
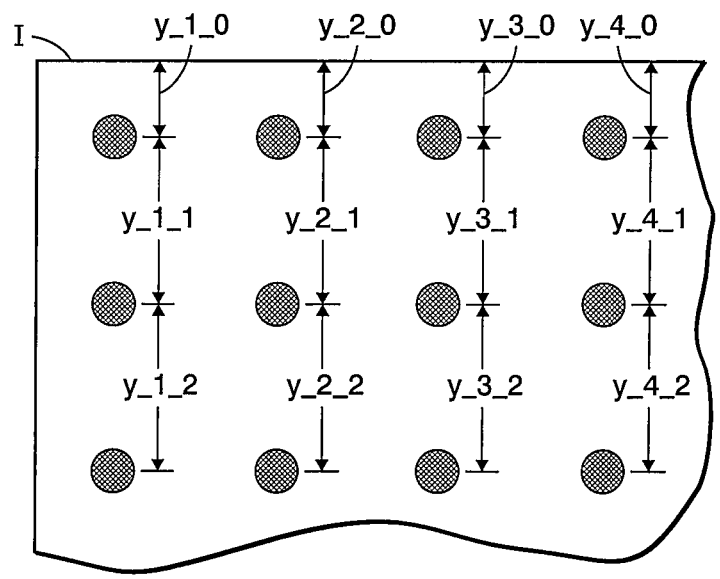

FIGS. 6a and 6b show exemplary measurements of an array A of indicia marks that may be accurately determined by the processor, according to an aspect of the application.

As illustrated, the processor 20 determines a series of accurate, localized measurements between adjacent indicia marks 11 of the array A in each or the process and cross-process directions.

As illustrated in FIGS. 6A and 6B, $x\_i\_j$ and $y\_i\_j$ represent the distances between the centers of adjacent indicia marks 11, where i and j are integers and indicate the locations between indicia marks and/or edges of the sheet. For example, i and j may indicate number of rows down and columns across, respectively for a given measurement. The measurement data may be analyzed along the process and/or cross-process directions in order to determine image geometries.

By printing the array A relatively close to the sheet edges, the sensor may also be able to measure the partial edges along with at least the most adjacent row and column of indicia marks 11. While the figures show the distance between centers of adjacent indicia marks may be measured, other measurement locations might also be used, such as between the edges of the indicia marks.

Based on the determination of image geometries, the size and shape of the input image to the print engine may be altered and/or compensated for. More importantly, with information provided by the processor 20 regarding the distances between adjacent indicia marks, more localized corrections may be realized to compensate for these problems.

For example, the print system or print engine may compensate for problems on a localized basis, such as, on a pixel-by-pixel basis and localized area basis in the vicinity of one or more indicia marks. Typically, the closer the indicia marks may be to each other, more important data may be determined.

In some implementations, the processor 20 may be configured, not only to determine image geometries, but that one or more geometries are consistently getting worse. For example, many problems may not be currently be at the level to require action, but over time may be increasing in frequency and/or intensity. According to one aspect of the application, a history of the measurements may be maintained in a log on the machine, and/or transferred remotely so they are made available to a Customer Service Engineer (CSE) for service. As such, the processor 20 may identify trends, in addition to specific geometries. This may trigger maintenance and/or repair action, for example, when geometries are outside of a predefined threshold.

Example 1

Image of Paper (IOP)

Figure 7:
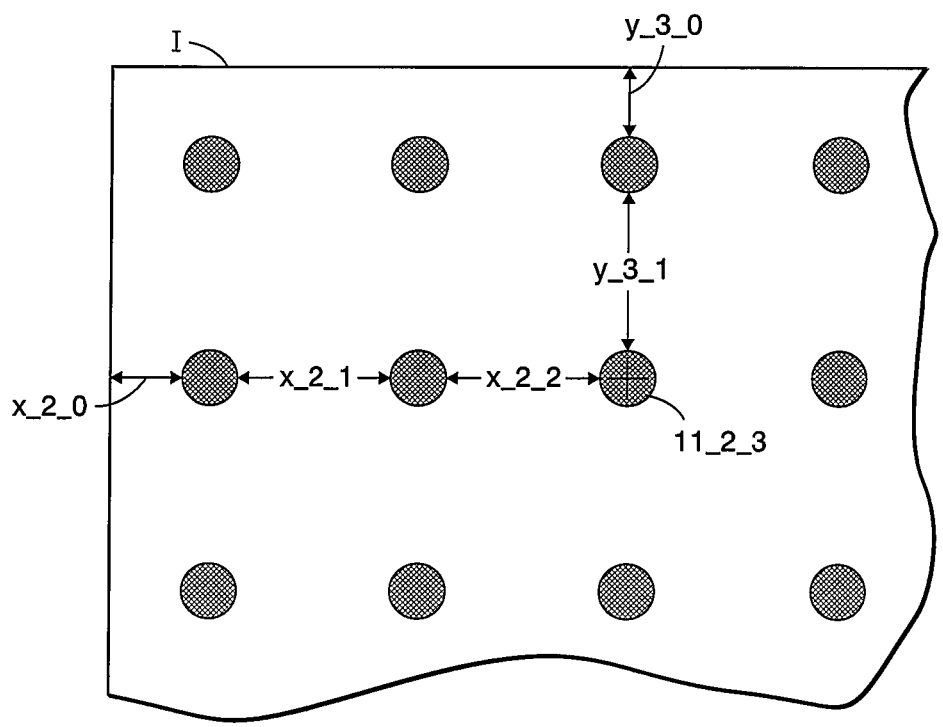
FIG. 7 shows determining the IOP geometrics for a given indicia mark, according to an aspect of the application.

FIG. 7 shows determining the IOP geometries for a given indicia mark. For example, an indicia mark 11_$_2$_$_3$ may be selected by the processor 20 for analysis. In other implementations, the indicia mark may be selected by a user for analysis.

For the selected indicia mark 11_$_2$_$_3$—corresponding to the indicia mark that is 2 marks-down and 3 marks-across from the top left corner indicia mark of the array A—the cumulative distance from the top left corner of the sheet S to the center of the given indicia mark 11_$_2$_$_3$ may determined as follows:

Distance (process direction)=$x\_2\_0 + x\_2\_1 + x\_2\_2$

Distance (cross-process direction)=$y\_3\_0 + y\_3\_1$

The values may be subsequently compared with distances derived and/or inferred from the input image data. By knowing the difference between where the indicia mark was printed and where it should have been printed provide invaluable information as to the quality of the printing. Angular rotation between where at least two indicia marks were printed and where they should have been printed may also be determined, if so desired.

For example, if an indicia mark is determined to be offset by a certain amount in the process-direction, the cross-process direction, or both, the print engine might shift an image in the vicinity of the indicia mark in the opposite directions an equivalent amount to compensate for these offsets.

Other indicia marks may be similarly selected by the processor 20. In some implementation, all indicia marks may be used for analysis.

Example 2

Magnification

Figure 8:
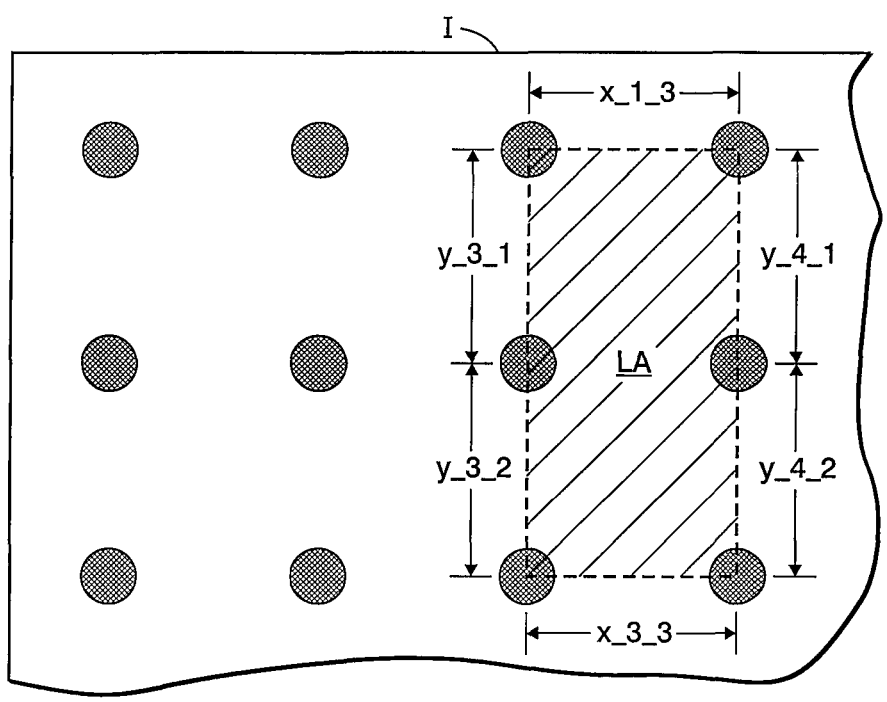
FIG. 8 shows determining the average magnification geometries for a localized (area) region of the array, according to an aspect of the application.

FIG. 8 shows determining the average magnification for a localized (area) region LA of the array A. The localized region LA may be selected by the processor 20 for analysis. In other implementations, the localized region may be selected by a user for analysis. For example, the magnification of the localized region LA, may be determined as follows:

Length (process direction)=$x\_1\_3$

Length (cross-process direction)=$y\_3\_1 + y\_3\_2$

The magnification of the localized region LA might also be determined by using the average of the lengths (e.g., $y\_3\_1 + y\_3\_2$ and $y\_4\_1$ and $y\_4\_2$) and widths (e.g., $x\_1\_3$ and $x\_3\_3$) on opposite sides, respectively of the region LA to improve accuracy.

Subsequently, the magnification geometric may then be determined as follows:

Magnification (process direction)=Length (process direction)/Expected Length (process direction)*100

Magnification (cross-process direction)=Length (cross-process direction)/Expected Length (cross-process direction)*100

The Predicted Area may be derived and/or inferred from the input image data. The resultant value Average Magnification may be a percentage.

According to one example, if the average magnification of a localized region is determined to be more (or less) than the Predicted Area the print engine might render an image in the vicinity of the localized area LA larger (or smaller) in area to compensate.

Example 3

Side1-to-Side 2 Show-Through

Figure 9A:
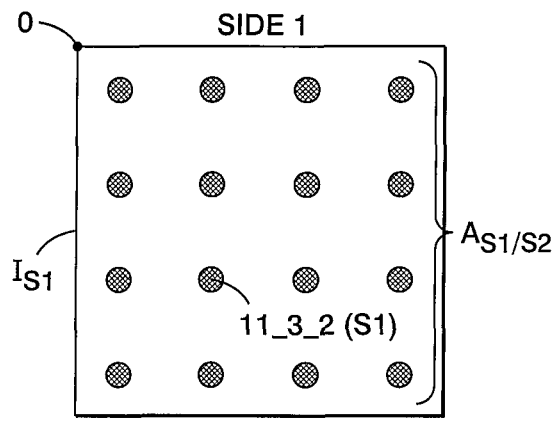
FIGS. 9A and 9B show determining Side1-to-Side 2 show-through geometries, according to an aspect of the application.
Figure 9B:
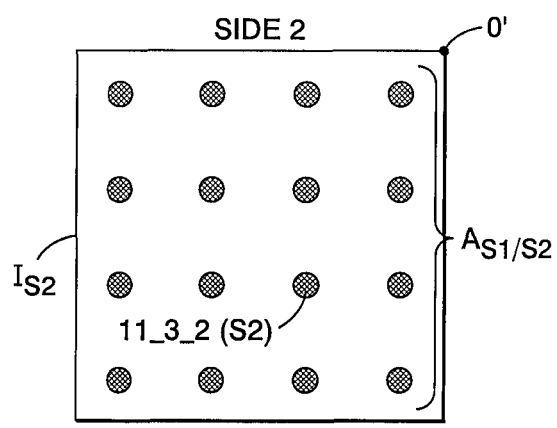

FIGS. 9A and 9B show determining Side1-to-Side 2 show-through geometries.

For example, a pair of sensors may be arranged above and below the sheet S, respectively, to view both top and bottom sides of the sheet S. Preferably, each side of the sheet may be sensed substantially simultaneously. As an alternative, the sheet S might be transferred past a sensor (to measure Side 1), flipped, and then feed back through the same sensor (to measure Side 2) to measure both sides.

An array $A_{S1/S2}$—for example, 4×4—may be printed on both sides of a sheet. Other dimensioned arrays are also possible. FIG. 9A shows a first image $I_{S1}$ of Side 1 of the sheet as captured by the upper sensor. Similarly, FIG. 9B shows a second image $I_{S2}$ of Side 2 of the sheet as captured by the lower sensor. Ideally, indicia marks on Side-1 of the sheet S, should line up with indicia marks on Side-2 (the bottom side) of the sheet S as measured relative to a common origin point.

Generally, the first image $I_{S1}$ will be substantially a mirror-image of the second image $I_{S2}$. Thus, for a given indicia mark 3 rows down and two columns across from the top left corner on Side 1, its location may be captured on as indicia mark 11_$_3$_$_2$ $_{(S1)}$ on the first image $I_{S1}$, as shown in FIG. 9A. However, this same indicia marks will be captured as indicia mark 11_$_3$_$_2$ $_{(S2)}$ on the second image $I_{S2}$, as shown in FIG. 9B. Both indicia marks 11_$_3$_$_2$ $_{(S1)}$, 11_$_3$_$_2$ $_{(S2)}$ are 3 rows down and 2 rows across from their respective origin points O, O'.

The processor 20 may compare the spacing of the two indicia marks $11\_3\_2\ (S1)$ and $11\_3\_2\ (S2)$ relative to the origin O, O', respectively. (see Example 1). A localized area of the first or second images $I_{S1}, I_{S2}$ might also be similarly analyzed by the processor 20 (see Example 2).

The processor 20 may be dedicated hardware, for example, an integrated circuit, microcontroller, ASICs or FPGAs. In addition, the processor 20 may be implemented through software (firmware), or a combination of dedicated hardware and software. For the different embodiments disclosed herein, the programming and/or configuration may vary.

While this invention has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the invention following, in general, the principles of the invention and including such departures from the present disclosure as come within known or customary practice in the art to which the invention pertains, and as may be applied to the essential features hereinbefore set forth and followed in the spirit and scope of the appended claims.

What is claimed is:

1. A system for accurately measuring image geometries within a printing system by measuring one or more two-dimensional arrays of indicia marks provided on both faces of a sheet of print media, the system comprising:
    a two-dimensional array sensor configured to capture an image of the one or more two-dimensional arrays of indicia marks provided on the sheet;
    a sheet transport configured to move the sheet past the sensor; and an image processor configured to analyze the captured image and to identify the position of the indicia marks and determine the spacing between adjacent indicia marks;
    wherein the two-dimensional array sensor comprises a pair of sensors arranged above and below the sheet of print media respectively to view both faces of the sheet of print media, and configured to capture the image from both faces of the sheet of print media;
    wherein the two-dimensional array sensor is a full width array (FWA) sensor which spans the cross-process length of the sheet.

2. The system according to claim 1, further comprising a print engine configured to print the array of indicia marks on the sheet such that at least two indicia marks are within the field of view of the sensor at any instant.

3. The system according to claim 1, further comprising a print engine configured to print the array of indicia marks on the sheet such that one indicia mark and one sheet edge are within the field of view of the sensor at any instant.

4. The system according to claim 1, where the processor is further configured to identify edges of the sheet.

5. The system according to claim 1, where the sheet transport is configured to transport the sheet at a constant velocity without substantial velocity variations.

6. The system according to claim 1, wherein the effective field of view of the sensor is configured to capture images of a plurality of overlapping sub-arrays of indicia marks.

7. The system according to claim 6, wherein the sensor is configured to capture multiple images of the same sub-array as it passes the sensor.

8. The system according to claim 6, wherein the processor is configured to analyze multiple images of the sub-array to determine an effective spacing between adjacent indicia marks.

9. The system according to claim 6, wherein the processor is configured to disregard captured images if the spacing between adjacent indicia marks of a captured image is outside a predetermined threshold.

10. The system according to claim 9, wherein the predetermined threshold is based upon analysis the spacing of indicia marks printed on at least one of: the same sub-array, a different sub-array, and different sheets.

11. The system according to claim 1, wherein the processor is configured to determine at least one of the following metrics: image on paper, average magnification, and Side-1-to-Side-2 show-through geometries using the spacing between adjacent indicia marks.

12. The system according to claim 1, where the indicia marks are observable in ultraviolet (UV) spectra.

13. A method for accurately measuring image geometries within a printing system by measuring one or more two-dimensional arrays of indicia marks provided on both faces of a sheet of print media, the method comprising:
    capturing an image of the one or more two-dimensional array of indicia marks provided on the sheet using a two-dimensional array sensor from both faces of the sheet of print media, while moving the sheet past the sensor;
    and analyzing the captured image to identify the position of indicia marks and determine the spacing between adjacent indicia marks;
    wherein the two-dimensional array sensor comprises a pair of sensors arranged above and below the sheet of print media respectively to view both faces of the sheet of print media;
    wherein the two-dimensional array sensor is a full width array (FWA) sensor which spans the cross-process length of the sheet.

14. The method according to claim 13, further comprising printing the array of indicia marks such that at least two indicia marks are within the field of view of the sensor at any instant.

15. The method according to claim 13, further comprising printing the array of indicia marks on the sheet such that one indicia mark and one sheet edge are within the field of view of the sensor at any instant.

16. The method according to claim 13, further comprising identifying edges of the sheet.

17. The method according to claim 13, wherein moving the sheet comprises transporting the sheet at a constant velocity without substantial velocity variations.

18. The method according to claim 13, wherein the effective field of view of the sensor is configured to capture images of a plurality of overlapping sub-arrays of indicia marks.

19. The method according to claim 18, further comprising capturing multiple images of the same sub-array as it passes the sensor.

20. The method according to claim 18, further comprising analyzing multiple images of the sub-array to determine an effective spacing between adjacent indicia marks.

21. The method according to claim 18, further comprising disregarding captured images, if the spacing between adjacent indicia marks of a captured image is outside a predetermined threshold.

22. The method according to claim 18, wherein the predetermined threshold is based upon analysis the spacing of indicia marks printed on at least one of: the same sub-array, a different sub-array, and different sheets.

23. The method according to claim 13, further comprising determining at least one of the following metrics: image on paper, average magnification, and Side-1-to-Side-2 show-through geometries using the spacing between adjacent indicia marks.

24. The method according to claim 13, where the indicia marks are observable in ultraviolet (UV) spectra.

* * * * *